United States Patent [19]
Malecki et al.

[11] 3,731,550
[45] May 8, 1973

[54] BELT SHIFTER FOR A VARIABLE SPEED DRIVE

[75] Inventors: Ronald J. Malecki, Milwaukee, Wis.; Kenneth J. Grall, Stevensville, Mich.

[73] Assignee: Whirlpool Corporation, Benton Harbor, Mich.

[22] Filed: Jan. 3, 1972

[21] Appl. No.: 214,757

[52] U.S. Cl. ................................. 74/242.3, 74/241
[51] Int. Cl. ........................... F16h 7/08, F16h 7/18
[58] Field of Search .......................... 74/242.3, 242.4, 74/241

[56] References Cited

UNITED STATES PATENTS

| | | |
|---|---|---|
| 3,303,924 | 2/1967 | Hartzell, Jr. ........................ 74/241 X |
| 3,570,318 | 3/1971 | Nakadaira ........................ 74/242.3 |
| 3,621,728 | 11/1971 | Steorts, Jr. ........................ 74/241 |

*Primary Examiner*—Leonard H. Gerin
*Attorney*—James S. Nettleton et al.

[57] ABSTRACT

A belt shifting device used with a variable speed drive system for a clothes dryer. The drive system has a drive pulley with an axially extending tapered drive surface and a belt engaging the drive surface and extending around an external surface of the dryer drum. The belt shifter utilizes a guide roller which frictionally engages the belt and is movable between two oblique positions on opposite sides of a line extending perpendicular to an edge of the belt with movement between the two positions causing the belt to shift positions on the drive pulley to change the linear speed of the belt and therefore the speed of rotation of the dryer drum.

10 Claims, 5 Drawing Figures

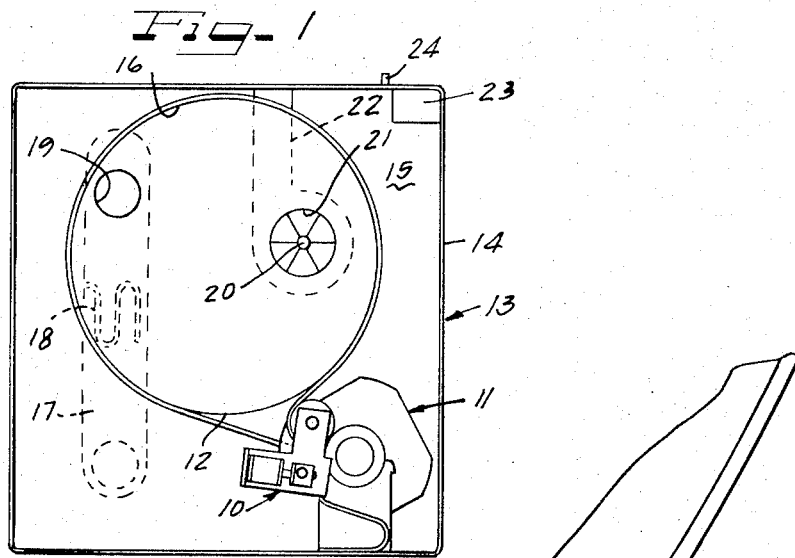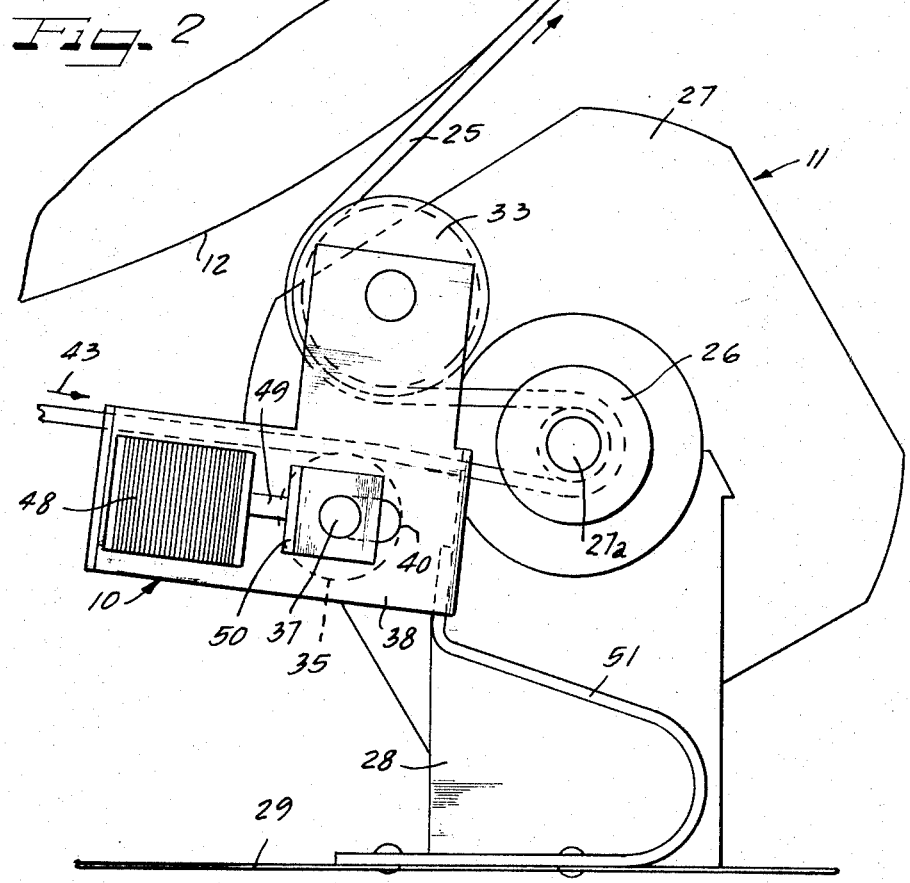

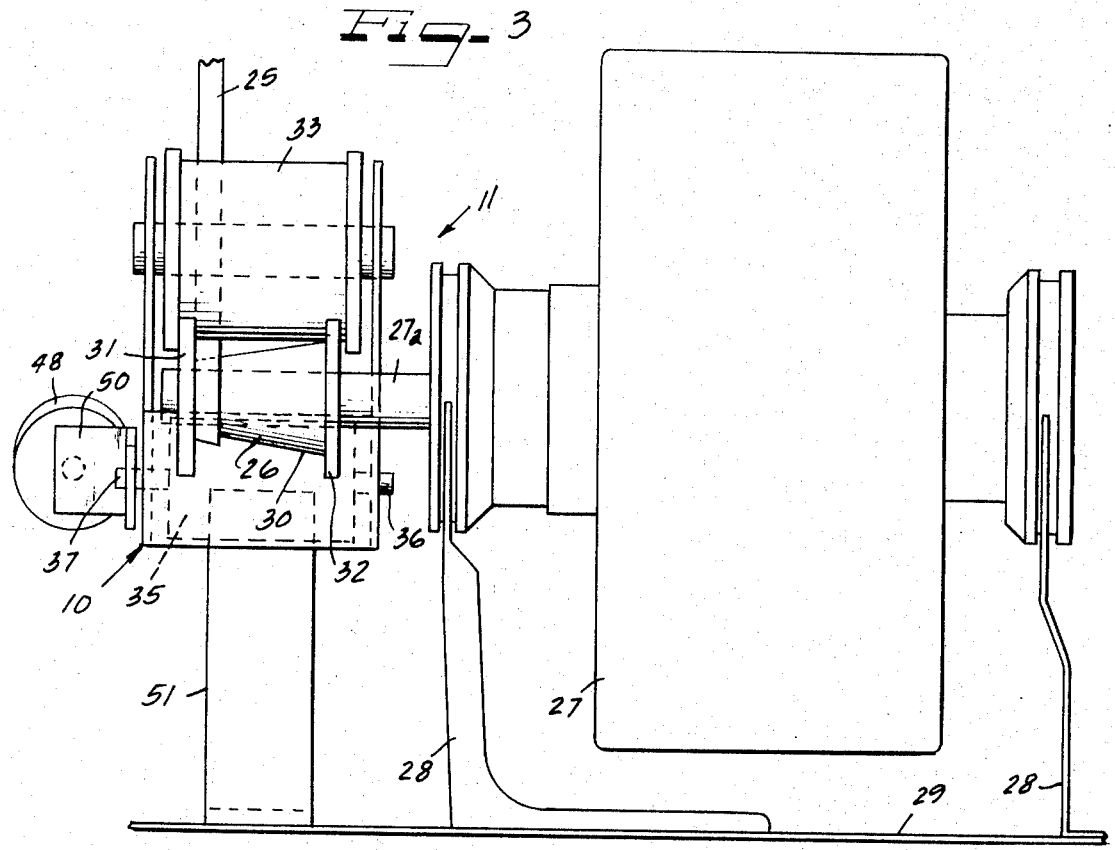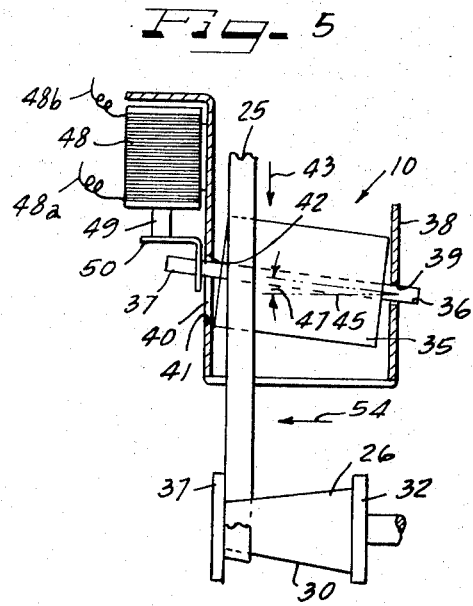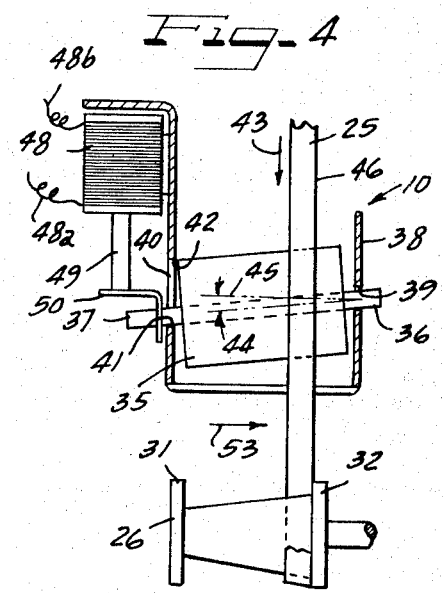

3,731,550

BELT SHIFTER FOR A VARIABLE SPEED DRIVE

BACKGROUND OF THE INVENTION

1. Field of the Invention

The present invention is directed to a belt shifter and particularly a belt shifter used in a variable speed drive mechanism for a clothes dryer.

2. Prior Art

In home appliances such as clothes dryers, the rotation of a drying chamber or drum has been accomplished by using a belt driving system in which the belt is shifted axially on a drive pulley having surfaces of different diameters to enable changes in the speed of rotation of the dryer chamber or drum. An example of a structure using such a drive system is disclosed in U.S. Pat. No. 3,365,810 which issued on Jan. 30, 1968 to T. S. Kotyuk et al.

In any belt drive system having variable speeds due to shifting the belt on a pulley having drive surfaces of different diameters, problems will occur in attaining a smooth transition from one drive surface to another drive surface of the pulley without buckling or twisting the belt. Various structures for belt shifting devices have been proposed and the above mentioned Kotyuk patent, U.S. Pat No. 17,743 issued July 7, 1857 to Knowles, and U.S. Pat. No. 101,745 issued April 12, 1870 to Leighton are examples of structures used for belt shifting. In the structures disclosed in both the Leighton and the Knowles patent, the belt shifting means includes a pair of rollers which frictionally engage opposite sides of the belt and which rollers have their axes shifted obliquely with respect to a line extending perpendicular to the edge of the belt to cause the belt to shift on the drive pulley. In each of these cases, the frictional engagement by two pulleys on the belt during shifting causes a high frictional drag to the belt during the shifting operation.

SUMMARY OF THE INVENTION

The present invention is directed to a belt shifting device particularly useful in a variable speed drive device or mechanism for a home appliance such as a clothes dryer which shifting device utilizes a cylindrical guide roller mounted for oblique movement with respect to a belt of the driving mechanism and in frictional engagement with the belt adjacent to a drive pulley of the driving device. The drive pulley has a conical or an axial extending tapered drive surface and the belt shifting device has means for obliquely shifting the guide roller to cause the belt to move axially on the drive surface to change the linear speed of the belt. In the preferred embodiment, the means for shifting the guide roller is an electrically actuated solenoid which acts in response to a signal such as from a switch or timing device to cause the belt to shift along the surface of the pulley to change the speed of the device such as the dryer drum driven by the belt. The guide roller and the solenoid are preferably supported on a frame which also supports a belt tensioning roller of the variable speed drive device.

DESCRIPTION OF THE DRAWINGS

FIG. 1 is a cross sectional view with parts in elevational illustrating the drive mechanism with the belt shifting device of the present invention utilized in a clothes dryer;

FIG. 2 is an enlarged end elevational view of the variable speed drive mechanism utilizing the belt shifting device of the present invention;

FIG. 3 is an enlarged side elevational view of the variable speed drive mechanism utilizing the shifting device of the present invention;

FIG. 4 is a diagrammatical view of the belt shifting device of the present invention in one position; and FIG. 5 is a diagrammatical view of the belt shifting device with the belt shifted to the other position.

DESCRIPTION OF THE PREFERRED EMBODIMENTS

The principles of the present invention are particularly useful in a belt shifting device generally indicated at 10 in FIG. 1 for a variable speed drive device or mechanism generally indicated at 11 for driving a dryer drum 12 of a home appliance such as a clothes dryer generally indicated at 13 in FIG. 1. The clothes dryer 13 has an outer casing 14 with an interior bulkhead wall 15 on which the dryer drum 12 is rotatably mounted in a conventional manner to form a drying chamber 16. The dryer 13 has an air flow system to circulate hot air through the chamber 16 which system includes a duct 17 containing heating means such as a heating coil 18, and having a port 19 discharging into the interior of the chamber 16. To cause an air flow through the duct 17 and chamber 16, a fan 20 draws air from the chamber 16 through a port 21 into a conduit or a duct 22 of a suitable exhaust system.

To select and control the drying cycle of the dryer 13, a timing device 23 is provided and is connected to suitable selector switches or knobs provided on the casing 14. Other controls or selectors such as a speed selecting switch 24 can be provided on the exterior of the casing 14.

During drying of clothes, it is desirable to be able to rotate the drum 12 with different rotational speeds. For example, if the articles of clothing or material being dried is heavy, a faster speed is desired to obtain a proper tumbling action within the drying chamber 16. With a light load, a slower speed of rotation is desirable to obtain the desired tumbling. Furthermore, if the dryer has a drum which rotates at a single speed, there is a substantial tendency towards tangling and balling of clothes while drying certain types of fabrics. By shifting the speed of the drum 12 to vary the tumbling speed of the drying chamber 16, the tendency for the clothes becoming tangled or balled up is reduced.

The drive mechanism 11, as best illustrated in FIGS. 2 and 3, comprises a belt 25 engaging an outer surface of the drum 12 and passing over a drive pulley 26 which is directly connected to a drive shaft 27a of a motor 27. The motor 27 is mounted in the casing 12 by supports 28 which are illustrated as being attached to a lower portion 29 of the casing 14. The drive pulley 26 has a conical drive surface or an axially extending tapered drive surface 30 which terminates at opposite ends in radial flanges 31 and 32. The taper of the pulley drive surface 30 provides at least two diameters for receiving the belt 25 so that with a constant rpm of the motor 27, different linear speeds for the belt 25 can be provided to drive the dryer drum 12 at different speeds of rotation. In order to maintain tension on the belt as it traverses drive pulley 26, a belt tensioning means such as a roller 33 is provided and the belt 25 is passed partially around the roller 33.

The belt shifter 10, as illustrated in FIGS. 2 and 3, comprises a cylindrical guide roller 35 having a roller axle with ends 36 and 37. The guide roller 35 is supported in a frame 38 with the end 36 being mounted for pivotal movement by being received in a substantially circular aperture 39 and the end 37 being mounted for oblique movement by being received in an elongated slot 40 which has ends 41 and 42 (FIGS. 4 and 5). The slot 40 and aperture 39 support the guide roller 35 to extend transverse to the direction of movement of the belt (indicated by arrow 43) and in frictional engagement with the belt 25 to cause a slight deflection in the path of the belt.

As illustrated in FIG. 4, when the end 37 of the axle of the guide roller 35 is engaged with the end 41 of the slot 40, the guide roller 35 is in a first oblique position with its axis forming an angle 44 with a line 45 extending perpendicular to an edge 46 of the belt 25. When the end 37 of the axle of the guide roller 35 is engaged with the end 42 of slot 40 (FIG. 5), the guide roller 35 is shifted to a second oblique position with the axis of guide roller 35 on the opposite side of the line 45 and forms an angle 47 therewith. The length of the slot 40 is such that the angles 44, 47 are each approximately 10° with the total transverse movement of the end 37 between the first and second position providing angular movement of the axis of roller 35 of approximately 20°.

To shift the guide roller 35 from the first to the second position, the shifting device 10 includes means for shifting which is illustrated as an electrically actuated solenoid 48 having a plunger 49 connected to the end 37 of the axle by a right angle connection piece or bracket 50 which loosely receives the end 37. When the solenoid 48 is de-energized, the frictional forces between the belt 25 and the guide roller 35 force the roller to the first position with end 37 engaging end 41 of the slot 40 (FIG. 4). When the solenoid 48 is energized, the plunger 49 is pulled into the coil of the solenoid to shift the end 37 into contact with end 42 of the slot 40 to cause the guide roller 35 to shift to the second position shown in FIG. 5.

In the preferred embodiment, the frame 38 has an extension which receives the tensioning roller 33 about which the belt 25 is passed partially around after engagement with the driven pulley 26. The frame 38 is resiliently mounted with respect to the motor 27 and pulley 26 by a spring means 51 which is attached to portion 29 of the casing 14.

In operation with the solenoid 48 de-energized, the movement of the belt 25 on the guide roller 35 forces the roller 35 to the first position (FIG. 4). When the roller is in the first position, it exerts a force transversely to the belt 25 to cause the belt to move in a direction indicated by an arrow 53 and to axially traverse the drive surface 30 of the pulley 26 until the belt engages the flange 32 which places the belt 25 in a high speed position.

When the solenoid 48 is energized, the plunger 49 is retracted into the coil to shift the end 37 against the end 42 of the slot 40 to shift the guide roller 35 to the second oblique position. In this position, the roller 35 applies a frictional force to the belt causing the belt to move in a direction indicated by an arrow 54 (FIG. 5) and to axially traverse the drive surface 30 of the pulley 26 until the belt 25 engages the radial flange 31. As illustrated, the effective diameter of the drive surface 30 adjacent flange 32 is greater than that of the drive surface 30 adjacent flange 31 and thus when in the position illustrated in FIG. 4, the linear speed of the belt 25 is greater than the linear belt speed with the belt in the position as illustrated in FIG. 5.

To actuate the solenoid 48, its leads 48a and 48b can be connected to a speed selector switch such as 24 (FIG. 1) to enable the belt shifter to be manually controlled by the operator of the dryer. While this operation was described as a manual operation by actuation of a dryer drum speed selection switch 24, the leads 48a and 48b of the solenoid 48 could be connected to the timing mechanism 23 or other appropriate means to cause actuation of the belt shifting device 10 at predetermined points in the drying cycle. It is also contemplated that the timing mechanism could be constructed to energize the solenoid 48 at predetermined points in the drying cycle for predetermined periods of time to change the speed of rotation of the drum 12 for predetermined periods of time in the drying cycle. In such a timing mechanism, suitable contacts would be provided to cause energization of the solenoid 48 for those periods of times when a low speed for the dryer drum speed was desired. The varying of the dryer drum speed would reduce the tendency of the clothes being dried from balling and tangling.

Although minor modifications might be suggested by those versed in the art, we wish to incorporate all embodiments and modifications which come within the scope of our contribution to the art.

We claim:

1. In a laundry appliance, a belt shifting device for moving a belt axially on a drive pulley having drive surfaces of different diameters, comprising:
   a cylindrical roller;
   mounting means for supporting said roller for oblique movement with respect to the belt and in frictional engagement with the belt adjacent to the drive pulley; and
   means for causing oblique movement of said roller so that the oblique movement in one direction causes said belt to be axially shifted along the drive surface of the drive pulley in one direction and the oblique movement in the opposite direction shifts the belt axially on the drive surface of drive pulley in the opposite direction.

2. A belt shifting device according to claim 1, wherein said mounting means comprises a frame pivotally supporting one end of the roller and supporting the other end of the roller for transverse movement.

3. A belt shifting device according to claim 2, wherein said means for causing an oblique movement of said roller comprises means mounted on said frame for moving said other end.

4. A belt shifting device according to claim 3, wherein said means for moving said other end comprises an electrically actuated solenoid.

5. A belt shifting device according to claim 2, wherein said frame has an aperture for receiving said one end and an elongated slot for receiving the other end.

6. In a clothes dryer having in combination an air flow system, a rotatable drum, a timing device, and a variable speed driving mechanism, said variable speed driving mechanism comprising:
   a motor, a belt; and a belt shifting mechanism having a generally cone-shaped pulley driven by said motor in frictional contact with said belt;

a rotatable cylindrical guide roller in frictional contact with said belt, said roller being mounted for oblique movement to a line at right angles to an edge of said belt, and means for causing an oblique movement of said roller for causing said belt to traverse said generally cone-shaped pulley along the axis of rotation thereof.

7. In a clothes dryer according to claim 6, wherein said roller is pivotably mounted at one end and transversely movable at the other end.

8. A clothes dryer according to claim 7, wherein said means for causing an oblique movement of said roller comprises means for moving said movable end.

9. In a belt drive system for a dryer drum having a drive pulley with a drive surface of different diameters, a belt extending from the drive pulley and engaging the external surface of the dryer drum, means for tensioning the belt and a belt shifter to move the belt axially on the pulley, the improvements comprising:

said drive pulley having a drive surface with an axial taper terminating with radial flanges;

said belt shifter having a cylindrical roller;

mounting means for supporting said roller in frictional engagement with the belt adjacent to the drive pulley, said mounting means enabling shifting of the roller between two oblique positions on opposite sides of a line extending perpendicular to the edge of the belt; and means for shifting the roller between the two positions to cause the belt to move axially on the tapered pulley surface to change the linear speed of the belt.

10. In a belt drive system according to claim 9, wherein the means for supporting comprises a frame having a circular aperture receiving one end of an axle of the roller and an elongated slot receiving the other end, and wherein the means for shifting comprises an electrically actuated solenoid mounted on the frame and attached to said other end of the axle for the roller.

* * * * *